A. E. CLEGG & T. JUBB.
BULLET MAKING MACHINE.
APPLICATION FILED APR. 6, 1917.
1,246,549.
Patented Nov. 13, 1917.
2 SHEETS—SHEET 1.
— FIG. 1. —
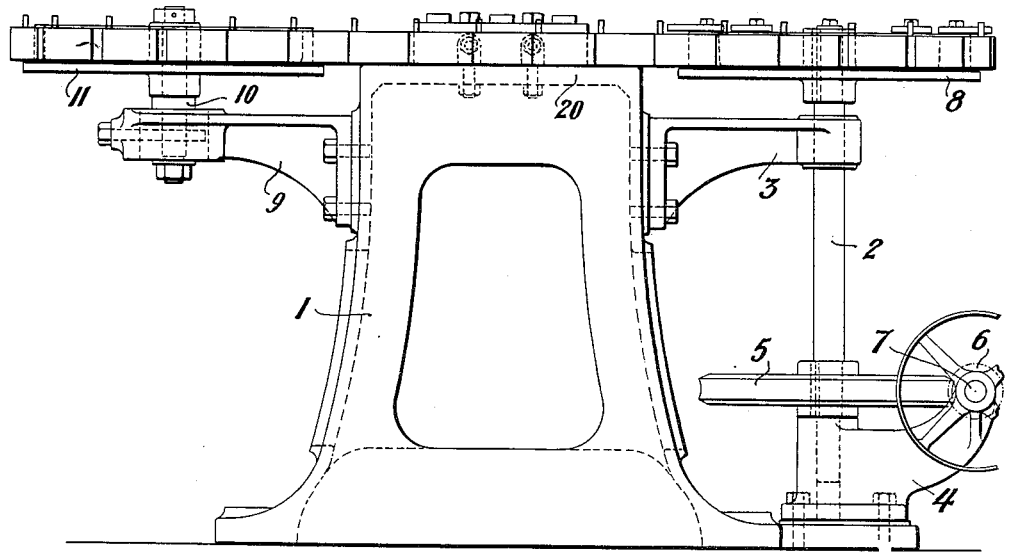
— FIG. 2. —
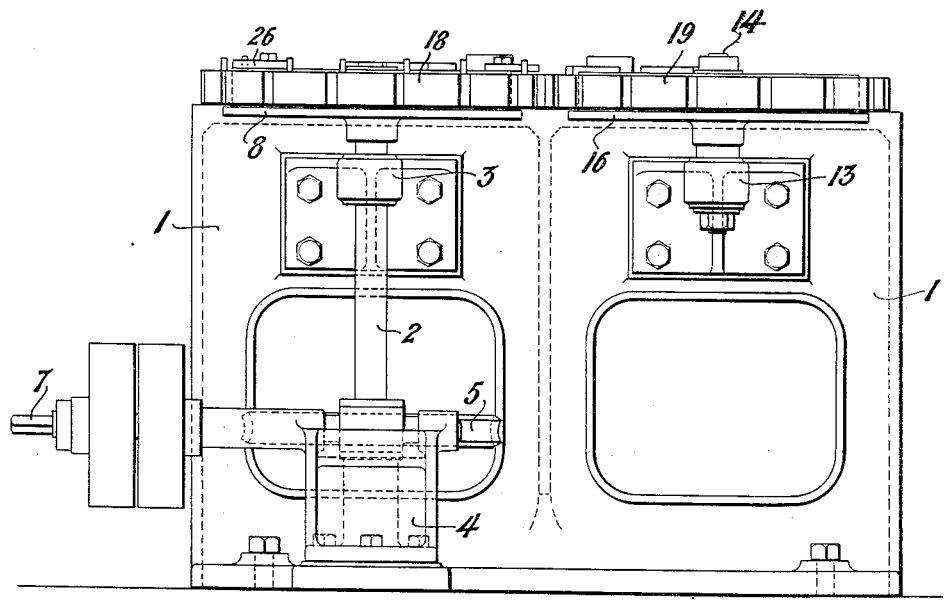

A. E. CLEGG & T. JUBB.
BULLET MAKING MACHINE.
APPLICATION FILED APR. 6, 1917.
1,246,549.
Patented Nov. 13, 1917.
2 SHEETS—SHEET 2.
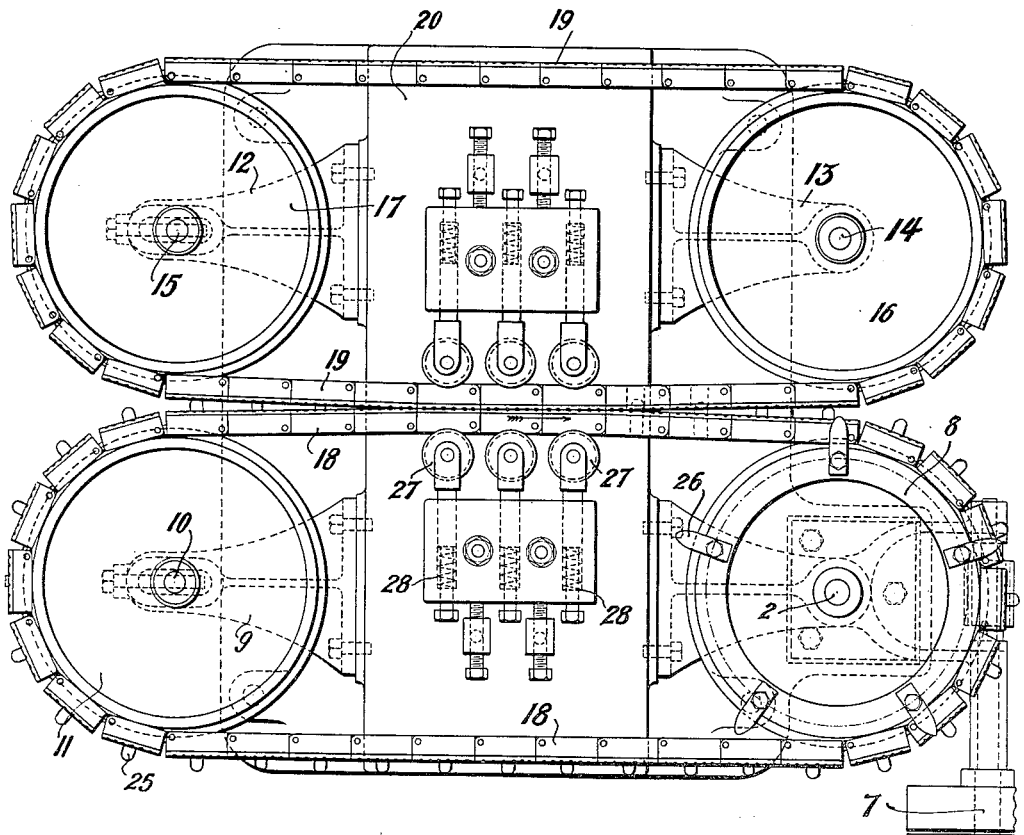
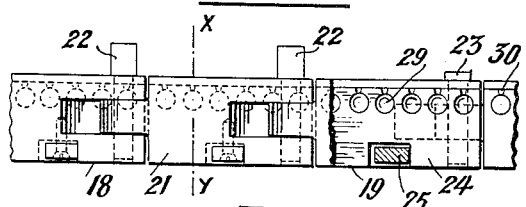
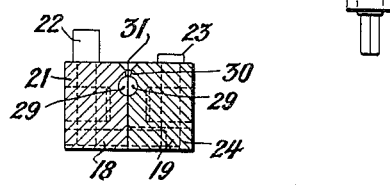
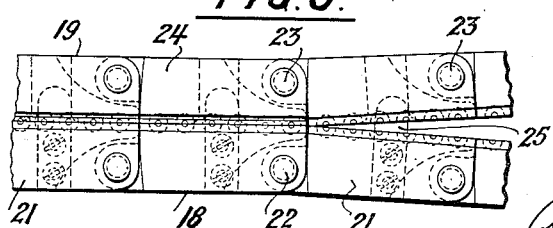
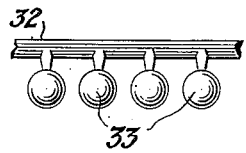

UNITED STATES PATENT OFFICE.

ALBERT EDWARD CLEGG AND THOMAS JUBB, OF LEEDS, ENGLAND.

BULLET-MAKING MACHINE.

1,246,549.  Specification of Letters Patent.  Patented Nov. 13, 1917.

Application filed April 6, 1917. Serial No. 160,109.

*To all whom it may concern:*

Be it known that we, ALBERT EDWARD CLEGG and THOMAS JUBB, subjects of the King of Great Britain, residing at Leeds, in the county of York, England, have invented certain new and useful Improvements in Bullet-Making Machines, and of which the following is a specification.

The present invention refers to a bullet-making machine as hereafter described and claimed.

The machine according to this invention comprises two driven endless chains, the links of which are composed of mold blocks pivoted together, each endless chain being carried by a pair of wheels so that the chains run in a horizontal plane, the lengths of the said chains passing with their under surfaces in contact with a stationary table, the blocks of one chain being brought consecutively into pressure contact with the blocks of the adjacent chain, and the blocks of one chain separating from the blocks of the other chain as they leave the table.

Each block is formed with a series of half molds in its outer face connected by a gateway with a rabbet formed along the upper edge of each block, so that when the blocks of the two chains are in face contact a series of complete molds are formed between the contacting faces, each mold being connected by a gateway with a continuous channel formed by the rabbeted edges of the blocks, and the continuous channel is supplied, while the blocks are in face contact, with molten metal which fills the molds, and there is thus continuously produced a series of bullets each suspended from a continuous strip of metal which is delivered from between the chains as the blocks composing the same separate from one another upon leaving the table.

The invention is described in the following description having reference to the accompanying drawings.

Figure 1 is a side elevation of the bullet-making machine, Fig. 2 is a right-hand end elevation, and Fig. 3 is a plan view of the same.

Fig. 4 is a side elevation, drawn to a larger scale than the previous figures and showing a portion of the chains of mold blocks, one of the said chains being partly broken away in order to illustrate in elevation the meeting face of one of the chains of mold blocks having the half molds formed therein. Fig. 5 is a transverse vertical section of the chains shown at Fig. 4 taken on the line X—Y of that figure, and Fig. 6 is a plan view of the portion of the chains shown at Fig. 4.

Fig. 7 shows in elevation the cast bullets as they are delivered from the machine.

The machine is constructed with a framework 1, Figs. 1 to 3, at one end of which is located a vertical driving shaft 2 supported by a bearing bracket 3 from the said framework at its upper end, and at its lower end supported by a footstep bearing 4.

Keyed upon the shaft 2 is a worm wheel 5 gearing with a worm 6 mounted upon a first-motion shaft 7 carried by an extension from the footstep bearing 4 of the shaft 2, the shaft 7 being driven from any suitable motive power.

Keyed upon the upper end of the driving shaft 2 is a horizontal disk wheel 8, while on a bracket 9 extending from the opposite end of the machine is a fixed vertical stud shaft 10, upon which stud shaft is carried a freely revoluble horizontal disk wheel 11.

Supported by brackets 12, 13 from the ends of the framework 1, see Fig. 3, are two stud shafts 14 and 15, the axes of the said stud shafts 14 and 15 being in a plane parallel with the plane containing the axes of the stud shaft 10 and the driving shaft 2, and upon said stud shafts 14, 15 are revolubly carried disk wheels 16, 17.

Carried by the pair of disk wheels 8 and 11 is an endless chain 18 composed of mold blocks pivoted end to end, and carried by the disk wheels 16, 17 is a similar chain 19 composed of similar mold blocks pivoted end to end, the adjacent lengths of the chains 18 and 19 facing each other and being but a short distance apart.

The chains 18 and 19 extending between the disk wheels pass over the flat surface of a table 20 forming the top of the framework 1.

The construction of the chains is illustrated at Figs. 4 to 6, the chain 18 being composed of mold blocks 21, one mold block 21 being pivoted to the next block 21 near the inner face of the chain by pivot pins 22 which extend above the upper surface of the chain in such manner as to engage the driving fingers 26 as hereinafter described, while the similar pivot pins 23 connecting the blocks 24 of the chain 19 do not extend materially above the upper face of the blocks.

The lower face of each block of the chain 19 has a groove, and extending from the lower face of each block 21 of the chain 18 is a tooth 25, the teeth 25 of the chain 18 engaging in the grooves formed in the blocks 24 of the chain 19 as the lengths of the chains 18 and 19 come adjacent to each other, so that the chain 19 is driven by the chain 18, it being thus also insured that the block of one chain shall be opposite to and register with the block of the other chain.

The disk wheel 8 is provided with a number of radially projecting fingers 26, Fig. 3, which overlie the blocks of the chain 18 and engage the projecting portions of the pivot pins 22 in order to drive the chain 18.

The blocks 21 and 24 in the adjacent lengths of the chains 18 and 19 are held together in face contact during their passage over the table 20 by means of rollers 27 acting against the inner faces of the chains and pressed thereonto by springs 28, Fig. 3, acting against the ends of plungers carrying the said rollers.

In the outer face of each block 21 of the chain 18, see Figs. 4 to 6, is formed a set of half molds 29, a similar set of half molds 29 being formed in the outer face of each block 24 of the chain 19, each block being also formed with gateways 30 extending between the half molds and a rabbet or chamfered edge extending the length of each block at the upper edge thereof, so that when the faces of the blocks 21 and 24 are in face contact, as shown at Fig. 5, as they pass across the table 20, there will be formed a number of molds 29 each communicating by a gateway with a continuous channel 31, the blocks of the chain 19 coming into face contact with the blocks of the chain 18 as they pass on to the table 20 in the direction of the arrow Fig. 3, and separating one from the other as they pass off of the table 20.

It will now be understood that when the machine is driven by the rotation of the driving shaft 2, the adjacent lengths of the chains 18 and 19 as they pass over the table 20 will be forced into and held in face contact by the rollers 27 and will separate as they leave the table 20.

When in motion as described, molten metal for filling the molds is delivered by any suitable spout into the channel 31 a short distance away from the point at which the blocks of the chains 18 and 19 first come into contact as they pass onto the table 20, and the metal poured into the channel 31 passes therefrom down the various gateways 30 and fills the complete molds 29 formed by the contacting of the blocks. The molten metal may be delivered directly from a suitable source of supply as will be well understood by those skilled in the art, and it has been found that the metal passes freely down the gateways 30 and fills the molds in a satisfactory manner, the flow of metal being regulated so as to only fill the channel 31 for a short distance immediately beneath the delivery spout.

By the time the contacting blocks of the chains 18 and 19 have traveled forward over the table 20 to the point at which they again separate, the metal has sufficiently solidified and a continuous strip of metal 32, Fig. 7, which has been formed in the channel 31 will be delivered from between the chains having bullets 33 suspended therefrom at regular distances apart, this being the product resulting from the operation of the machine. The bullets 33 can then be cut off and the strip 32 returned to the melting pot or furnace, while the bullets can be polished up or finished in any well known manner.

Although the molds and the bullets produced therefrom are shown as of spherical formation in the drawings, it will be readily understood that any desired form of bullet can be produced by suitably shaping the molds.

What we claim as our invention and desire to secure by Letters Patent is:—

1. In a bullet-making machine; the combination of two endless chains composed of pivoted blocks, wheels to carry said chains to permit the outer faces of the blocks of one length of one chain to travel in surface contact with the outer faces of the blocks of the adjacent length of the other chain, means for giving motion to said chains by driving connections between one of said wheels and one chain and between the latter and the second chain to cause said adjacent lengths thereof to travel in the same direction and at the same speed and for causing the blocks of one chain to register with the contacting blocks of the other chain, means for pressing the outer faces of the blocks of the adjacent lengths of said two chains into surface contact, said blocks having their outer upper edges chamfered to produce a longitudinal channel to receive molten metal when said blocks coincide and contact with each other, the outer face of each block having a series of half molds formed therein and having recessed gateways in the face of each block extending between said half molds and said chamfered edge to form complete bullet molds between said chains and a passage way to each bullet mold from said channel when said blocks of said two chains contact.

2. In a bullet-making machine; the combination of two endless block chains, pivot pins connecting the blocks of each chain, said pivot pins of one of said chains extending above the upper surface of the blocks, two pairs of wheels one to carry each chain so that the said chains extend in a horizontal plane with the outer face of the length of one chain adjacent to the outer face of the length of the other chain, radial fingers on one of the carrying wheels of the chain having the extending pivots to contact with said pivot pins to drive said chain, a tooth extending horizontally from the base of each block of one of said chains, each block of the opposite chain having a groove on its under surface to receive said tooth of the opposed block to insure the registering of the block of one chain with the block of the opposed chain when said blocks are brought into surface contact and to cause the two chains to travel with their adjacent lengths at the same speed and in the same direction, means for revolving the wheel carrying the radial teeth, means for pressing the outer faces of the blocks of the adjacent lengths of said two chains into surface contact, a horizontal table upon the surface of which the adjacent lengths of said chains pass, the outer face of each block having half molds formed therein to compose entire molds when the blocks are brought into face contact, each block having a chamfered edge to compose a longitudinal channel when said blocks are brought together to receive molten metal and said blocks having recessed gateways to form passages to conduct said molten metal from said channel to said molds.

3. In a bullet-making machine; the combination of two endless chains composed of pivoted blocks, wheels to carry said chains to cause the faces of the blocks of one length of chain to lie adjacent to the blocks of the adjacent length of the other chain, rollers and springs to press said rollers against the inner surface of one chain and opposed rollers and springs acting thereon to press the inner surface of the other chain at the part where the two chains are adjacent to press the outer faces of the blocks of the adjacent lengths of the two chains into surface contact, means for giving motion to said chains to cause the blocks of the adjacent lengths of the chains to travel in the same direction and at the same speed and to cause the blocks of one chain to register with the contacting blocks of the other chain, the outer face of each block having half molds formed therein to compose entire molds when the blocks are brought into face contact, each block having a chamfered edge to compose a longitudinal channel when said blocks are brought together to receive molten metal, and said blocks having recessed gateways to form passages to conduct said molten metal from said channel to said molds.

4. In a bullet-making machine; the combination of two endless chains composed of pivoted blocks and located in a horizontal plane, two pairs of wheels on vertical axes one pair to carry each chain, said wheels being so located that the outer face of the length of one chain is adjacent to the outer face of the length of the other chain, a horizontal table upon the surface of which the adjacent lengths of said chains pass, rollers carried from said table and springs to press said rollers against the inner surface of one chain, and opposed rollers and springs acting thereon to press the inner surface of the other chain at the part where the two chains are adjacent to press the outer faces of the blocks of the adjacent lengths of the two said chains into surface contact, said outer faces of said two adjacent lengths of said chains separating as the chains pass around the carrying wheels, said chains having the upper outer edge of each block chamfered to produce a longitudinal channel between said chains at the part where they contact one with another to receive molten metal, and the outer face of each block having a series of recesses composing half molds for bullets, and each block having a groove extending from each half mold to meet said chamfered edge, means for giving motion to said chains so that the meeting blocks of said chains travel in the same direction at the same speed and register with each other to bring the half molds and recesses of one chain to coincide with the half molds and recesses of the other chain to form complete gateways leading from said longitudinal channel to conduct molten metal to the complete molds formed by the conjunction of said half molds, said bullets so formed and connected to one another by the metal in said gateways and longitudinal channel being delivered as said chains separate.

In witness whereof we have hereunto set our hands in the presence of two witnesses.

ALBERT EDWARD CLEGG.
THOMAS JUBB.

Witnesses:
  John Jowett,
  Cyril Bellamy.